D. R. PRATT.
Car-Spring.

No. 168,845. Patented Oct. 19, 1875.

Witnesses:
B. Edwards
J. S. Pryne

Inventor:
Daniel R. Pratt
by B. F. James,
his atty

UNITED STATES PATENT OFFICE.

DANIEL R. PRATT, OF NEW YORK, N. Y.

IMPROVEMENT IN CAR-SPRINGS.

Specification forming part of Letters Patent No. 168,845, dated October 19, 1875; application filed August 26, 1875.

*To all whom it may concern:*

Be it known that I, DANIEL R. PRATT, of the city of New York, in the county of New York and State of New York, have invented certain new and useful Improvements in Railway-Car Springs; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction of railway-car springs (and which can be used for other purposes when a powerful elastic spring is required) in such a manner as to present a series of globe-shaped forms externally, and of the same configuration internally, and of a uniform or nearly-uniform thickness. The length of the spring depends upon the purposes to which such spring is designed to be applied, and two or more of such globe-form cast together, forming one spring, the addition of each series so formed adding to the elasticity of the same. The shape so imparted, being formed upon a suitable core, admits of the more perfect curing of the india-rubber throughout the whole body of the same. When the spring is compressed the form imparted to it admits of each of the globes resting upon the other.

Figure 1:
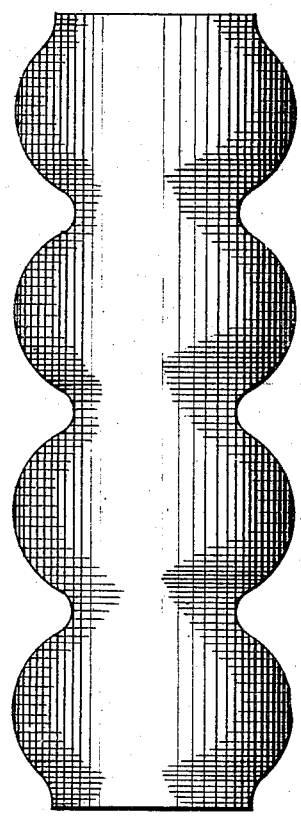
Figure 2:
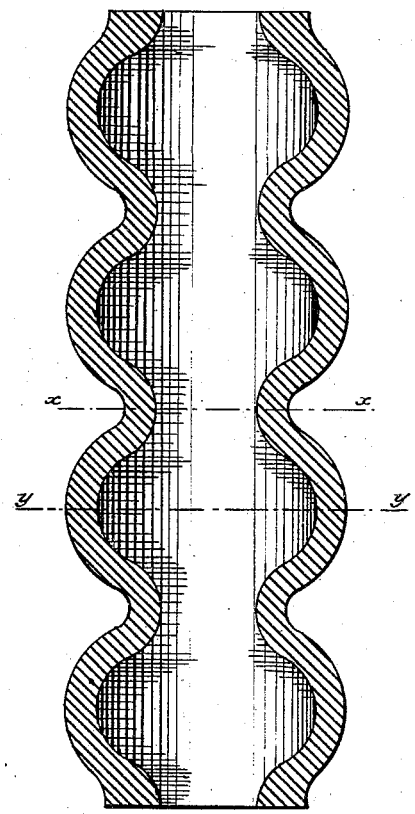
Figure 3:
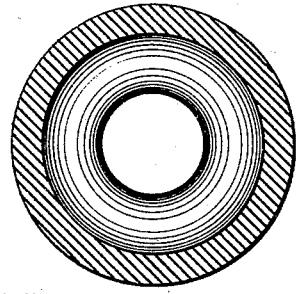
Figure 4:
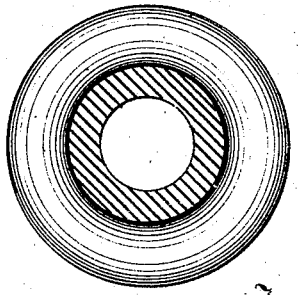

In the drawings, Figure 1 shows the external form of the spring; Fig. 2, a cross vertical section of same, showing the internal configuration; Fig. 3, a cross-section in line $y\ y$, Fig. 1; and Fig. 4, a cross-section in line $x\ x$, Fig. 1.

These springs are formed or cast upon a core of the form and configuration of the spring, as shown; and to give it such configuration I can employ a rod equal in diameter to the small opening in the top and bottom of the spring, molding upon it clay or other material in its plastic state or condition, of the shape required. After being hardened by exposure to the air or heat, a shell of corresponding shape to the core can be applied, and the rubber spring cast and cured in the usual manner. Springs of any size, of the form herein shown, can thus be manufactured possessing the elastic properties desired, of any required length, and of such size as may be adapted to the various purposes to which such springs may be applied. These springs can be secured in any suitable manner, and in such position where they are intended to operate, or be operated upon, by means of a rod passing through them to sustain them when compressed, and preventing any lateral or other movement except in line with such rod or guide, my purpose in this invention being to construct a spring of uniform thickness, or nearly so, throughout its entire length, as this will produce a more elastic as well as economical spring.

I do not wish or intend to claim as my invention the formation of ridges upon the end or ends of such spring, neither annular corrugations around the body of the same; but

What I claim as my invention, and desire to secure by Letters Patent, is—

A railway-car spring the external and internal surfaces of which are recessed in globe-shaped form, so that when compressed each globe in the series may rest and impinge upon the other, as and for the purpose herein set forth.

In testimony that I claim the foregoing as my own I affix my signature in presence of two witnesses.

DANIEL R. PRATT.

Witnesses:
E. F. M. FAEHTZ,
B. F. JAMES.